US006918296B1

(12) United States Patent
Urquidi et al.

(10) Patent No.: US 6,918,296 B1
(45) Date of Patent: Jul. 19, 2005

(54) METHOD OF MEASURING FLUID PHASES IN A RESERVOIR

(75) Inventors: Carlos A. Urquidi, Chihuahua (MX); Francisco J Sanchez, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/793,556

(22) Filed: Mar. 4, 2004

(51) Int. Cl.[7] ............................................. G01F 23/00
(52) U.S. Cl. .................................. 73/304 R; 73/304 C
(58) Field of Search .......................... 73/304 C, 304 R, 73/290 B

(56) References Cited

U.S. PATENT DOCUMENTS

| 4,286,208 A | * | 8/1981 | French et al. | 324/663 |
| 4,417,472 A | * | 11/1983 | Tward | 73/304 C |
| 4,601,201 A | * | 7/1986 | Oota et al. | 73/304 C |
| 4,733,560 A | * | 3/1988 | Dam | 73/304 C |
| 5,811,677 A | * | 9/1998 | Cournanc | 73/304 R |
| 2004/0149032 A1 | * | 8/2004 | Sell | 73/304 C |

* cited by examiner

Primary Examiner—Hezron Williams
Assistant Examiner—Tamiko Bellamy
(74) Attorney, Agent, or Firm—Jimmy L. Funke

(57) ABSTRACT

A method identifies a level of each of a plurality of liquids in a reservoir. The method includes using a sensing assembly having first and second electrodes extending along a side of the reservoir, wherein the first and second electrodes combine to form a plurality of capacitors each having a unique capacitance. The method includes the steps of applying an input AC signal voltage to the first electrode. An output AC signal voltage is then measured across the second electrode. The method continues by locating clusters of frequency variations. The method then associates a level identification for each of the plurality of liquids with each of the clusters of frequency variations.

19 Claims, 5 Drawing Sheets

METHOD OF MEASURING FLUID PHASES IN A RESERVOIR

BACKGROUND ART

1. Field of the Invention

The invention relates to a method for measuring fluid levels in a reservoir. More particularly, the invention relates to a method for measuring fluid levels in a reservoir having multiple fluids being stored therein by analyzing the resonance of the output signal of the fluid level sensing assembly.

2. Description of the Related Art

The storage and delivery of liquids is an important feature of many mechanisms. In an automotive environment, proper delivery of liquids is essential for the functioning and maintenance of a motor vehicle. By way of example, a motor vehicle will not function without fuel, typically liquid gasoline. That same motor vehicle will not function properly without the proper amount of oil stored in the internal combustion engine allowing it to lubricate and cool itself. These are just two fluids in a particular environment that require close observation to make sure its host mechanism, i.e., the motor vehicle, can operate properly.

Currently, there are a number of ways in which a fluid level may be measured. The mechanisms used to measure the fluid level help determine if more fluid is required in order to continue the proper maintenance and operation of the host mechanism. Fluid level measuring mechanisms include floating arm mechanisms, pressure sensors, capacitive sensors, and ultrasonic sensors. The most commonly used fluid level measuring system is the floating arm mechanism.

The floating arm mechanism is an imperfect mechanism for several reasons. First, the floating arm mechanism requires moving parts inside a liquid-filled container. This requires increased time to install the floating arm mechanism and seal it and the container or reservoir. Resistive strips used by the floating arm mechanism are susceptible to contamination and can develop contact problems. The contamination and contact problems result in erroneous measurements. Looking forward, the floating arm fluid measuring mechanism will not be able to differentiate between different types of liquids within the same reservoir. This problem will increase in the automotive environment as different types of fuels will be accepted by each motor vehicle resulting in the stratification of the fluids within a particular reservoir.

Another reason the floating arm mechanisms are inferior is that they measure liquid levels inefficiently when the reservoir holding the liquid is unusually shaped. Oftentimes when a motor vehicle is an all-wheel drive vehicle, an extra drive shaft is required to extend along the underbody of the motor vehicle. The extra shaft typically extends through the space used by the fuel tank. Therefore, the fuel tank must be modified resulting in an unusually shaped fuel tank. Multiple floating arm mechanisms are required to get accurate readings from these unusually shaped fuel tanks. This adds considerable costs to the fuel tank construction.

Compounding the problem of measuring liquids in a reservoir is the fact that liquids can separate into multiple phases wherein the various phases do not mix and physically separate. This typically occurs when the liquid in the reservoir is contaminated. Readings taken from level sensors will be inaccurate if they cannot adequately differentiate between the differing phases.

In some situations, the liquids may be compound liquids by design. More specifically, new forms of gasoline include gasoline/alcohol mixtures. These types of fuels can easily separate or stratify because they are more susceptible to absorbing water.

SUMMARY OF THE INVENTION

A method identifies a level of each of a plurality of liquids in a reservoir. The method includes using a sensing assembly having first and second electrodes extending along a side of the reservoir, wherein the first and second electrodes combine to form a plurality of capacitors each having a unique capacitance. The method includes the steps of applying an input voltage to the first electrode. An output voltage is then measured across the second electrode. The method continues by locating clusters of frequency variations. The method then associates a level identification for each of the plurality of liquids with each of the clusters of frequency variations.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
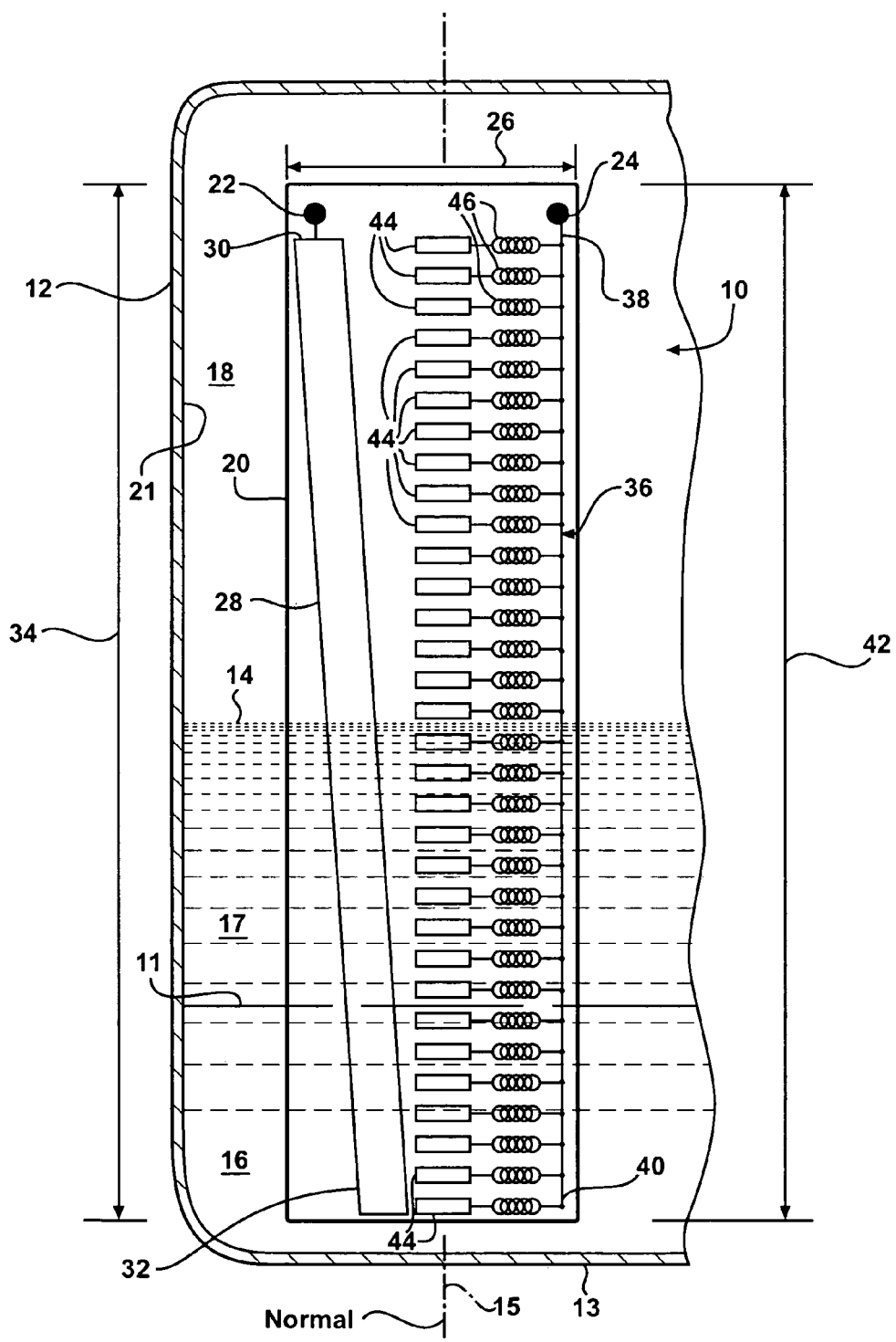
FIG. 1 is a side view of one embodiment of the sensing assembly in a reservoir, shown in cross section, that is partially filled with two liquids.

Referring to FIG. 1, a sensing assembly is generally indicated at 10. The sensing assembly 10 senses liquid levels in a reservoir 12. The sensing assembly 10 creates a sensing signal 54 (shown in FIGS. 3 and 4) to identify levels 11, 14 that liquids 16, 17 are at within the reservoir 12. The sensing assembly 10 is designed such that it is presumed that air 18 fills the portion of the reservoir 12 that the liquids 16, 17 do not. While it is contemplated that the embodiment shown in the Figures illustrates a sensing assembly 10 for a fuel tank 12 of a motor vehicle, it should be appreciated that the reservoir 12 may be any reservoir designed to hold liquids 16, 17 therein and that there may be any number of liquids stored within the reservoir 12.

The reservoir 12 includes a bottom surface 13 that defines a normal 15 extending up therefrom. In the instance when the bottom surface 13 does not extend through a single plane parallel to the horizon, the normal 15 will be treated as though it is extending normal to the horizon. Therefore, the surface of the liquid 16 is always perpendicular to the normal 15.

The sensing assembly includes a base 20. The base 20 is a rectangular piece of material that is capable of having electronics fixedly secured thereto. In addition, the base 20 is fabricated of a material that does not corrode with exposure to either air 18 or any liquids 16, 17 that are contemplated to be stored within the reservoir 12. The base 20 is mountable to a side 21 of the reservoir 12 allowing it to be secured in a predetermined position within the reservoir 12.

The sensing assembly 10 also includes a first electrical conductor 22 and a second electrical conductor 24. The first 22 and second 24 electrical conductors extend into the reservoir 12. These electrical conductors 22, 24 allow the sensing assembly 10 to be connected to a control circuit (not shown) that creates a signal which is modified by the sensing assembly 10. The second electrical conductor 24 is disposed from the first electrical conductor 22 a predetermined distance. It should be appreciated by those skilled in the art that the lead configuration for the electrical conductors 22, 24 may change at some point within the reservoir 12 based on design requirements.

Extending down along the base 20 is a first electrode 28. The first electrode 28 is electrically connected to the first electrical conductor 22. The first electrode 28 extends between a first conductor end 30 and a first distal end 32. The first electrode 28 defines a first electrode length 34 extending therebetween. As is shown in FIG. 1, the first electrode 28 is an elongated, continuous plate of conductive material wherein the first electrode length 34 is greater than its width.

The sensing assembly 10 also includes a second electrode 36. The second electrode 36 is electrically connected to the second electrical conductor 24. The second electrode 36 is an elongated conductor that extends between a second conductor end 38 and a second distal end 40. The second electrode 36 is spaced apart from the first electrode 28. The second electrode 36 defines a second electrode length 42 that extends between the second conductor end 38 and the second distal end 40. The second electrode 36 also is fixedly secured to the base 20 and extends therealong.

A plurality of plates 44 extend along the base 20 and are fixedly secured thereto. The plurality of plates 44 are positioned between the first electrode 28 and the second electrode 36. Each of the plurality of plates 44 are equal in size and are coplanar. Each of the plurality of plates 44 is operatively connected to the second electrode 36 such that each of the plurality of plates 44 is electrically connected to the second electrical conductor 24. This electrical connection includes an inductor 46. The inductors 46 are connected between each of the plurality of plates 44 and the second electrode 36 such that the inductors 46 and the plurality of plates 44 are connected in series with respect to the second electrode 36.

In operation, the sensing assembly 10 uses each of the plurality of plates 44 and the first electrode 28 to create a plurality of capacitances by having the first electrode 28 act as a plurality of first plates 48 (FIG. 2) and each of the plurality of plates 44 acting as second plates 49 for capacitors 50. A signal is generated by a signal generator 52 and the control circuit identifies the level 14 of the liquid 16 by how the signal generated by the signal generator 52 is modified by the sensing assembly 10. This operation will be discussed in greater detail subsequently.

Referring again to FIG. 1, the sensing assembly 10 has the first electrode 28 extending down the base 20 at an angle with respect to the normal 15 of the reservoir 12. The first electrode 28 extends at an acute angle with respect to the normal 15, which allows the portion of the first electrode 28 disposed adjacent the second distal end 40 of the second electrode 36 to be closer to the plates 44. Continuing with this, the first electrode 28 is further from the plates 44 disposed adjacent the second conductor end 38 of the second electrode 36. By positioning the second electrode 36 in such a manner, the capacitances for the capacitors 50 that are closer to the distal ends 32, 40 of the electrodes 28, 36 are greater than those disposed the first 30 and second 38 conductor ends.

Figure 2:
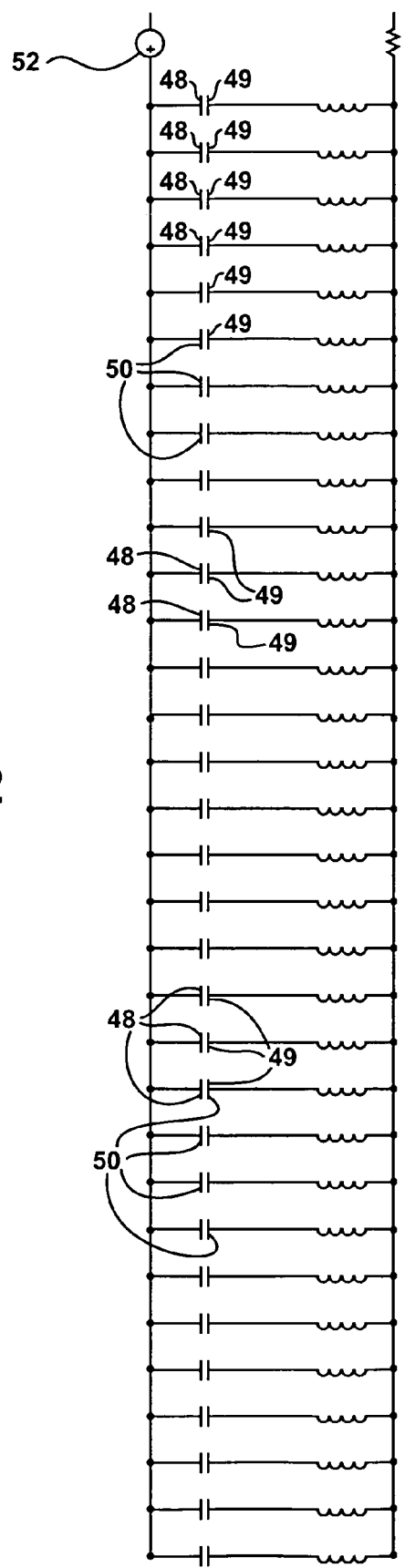
FIG. 2 is an electrical schematic of one embodiment of the sensing assembly.
Figure 3:
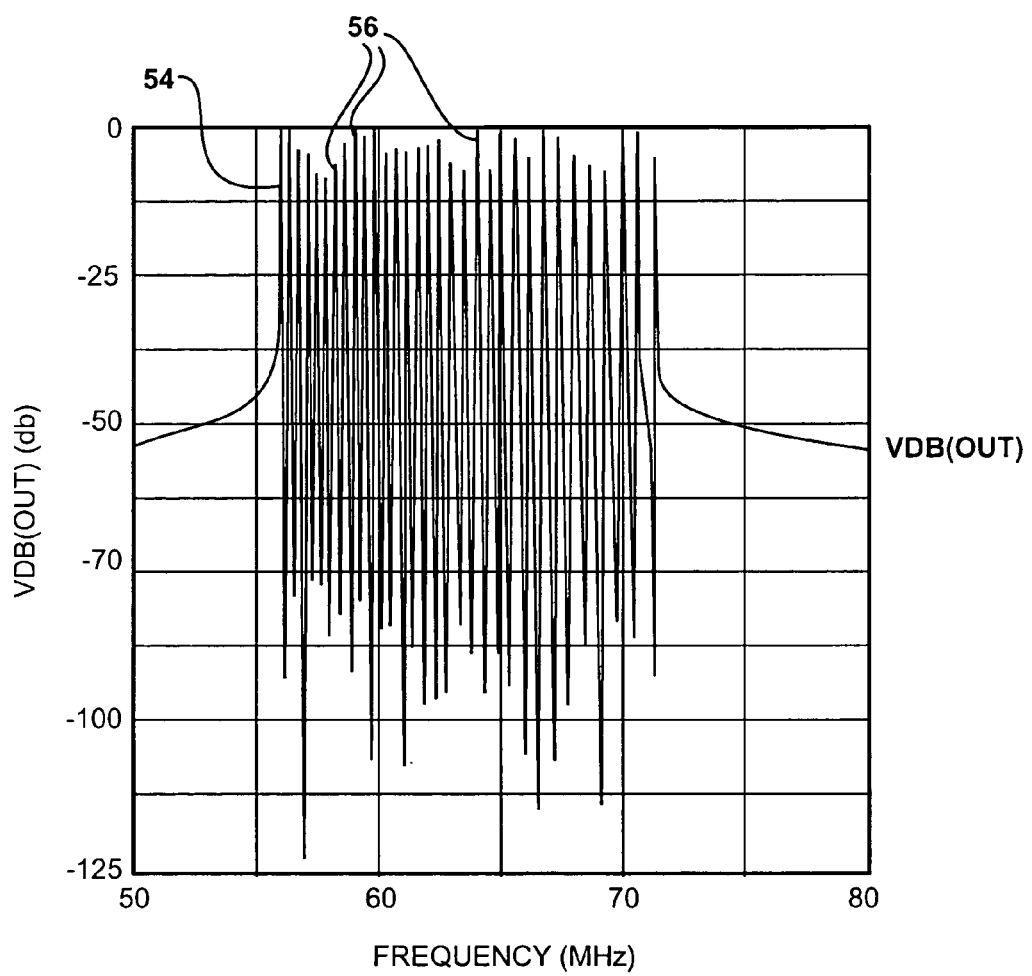
FIG. 3 is a graphic representation of an output of the sensing assembly when the reservoir is empty.

Referring to FIG. 3, a graph representing the sensing signal 54 as seen by the control unit is shown. In FIGS. 1 and 2, there are 32 capacitors 50 created between the first electrode 28 and each of the 32 plurality of plates 44. It should be appreciated that any number of capacitors 50 may be created based on the design specifications and the accuracy requirements for a particular reservoir 12.

Returning attention to FIG. 3, there are 32 spikes 56 in the sensing signal 54 which represents an output from each of the 32 capacitors 50. Each spike 56 represents a frequency change and, for purposes of this disclosure, will be termed as a rapid frequency change. Because the first electrode 28 extends along the base 20 at an angle with respect to each of the plurality of plates 44, each capacitor 50 has its own resonant frequency. In the example shown in FIGS. 1 and 2, each of the inductors 46 has an equal inductance of 100 micro henries. With the total capacitance of the capacitors 50 being 1.6 pico farads, each capacitor 50 has an approximate value of 50 femto farads.

Based on these values, a frequency range for the spikes 56 extends between 50 MHz and 75 MHz when there is no liquid 16 in the reservoir 12. This frequency range is used as a calibration for the sensing assembly 10. More specifically, when the reservoir 12 is filled with air 18 and void of any liquid, the output of each of the capacitor/inductor pairs resides within the 50–75 MHz range. It should be appreciated that the distribution of the spikes 56 is not even and is dependent on the liquid that is poured into the reservoir 12.

Figure 4:
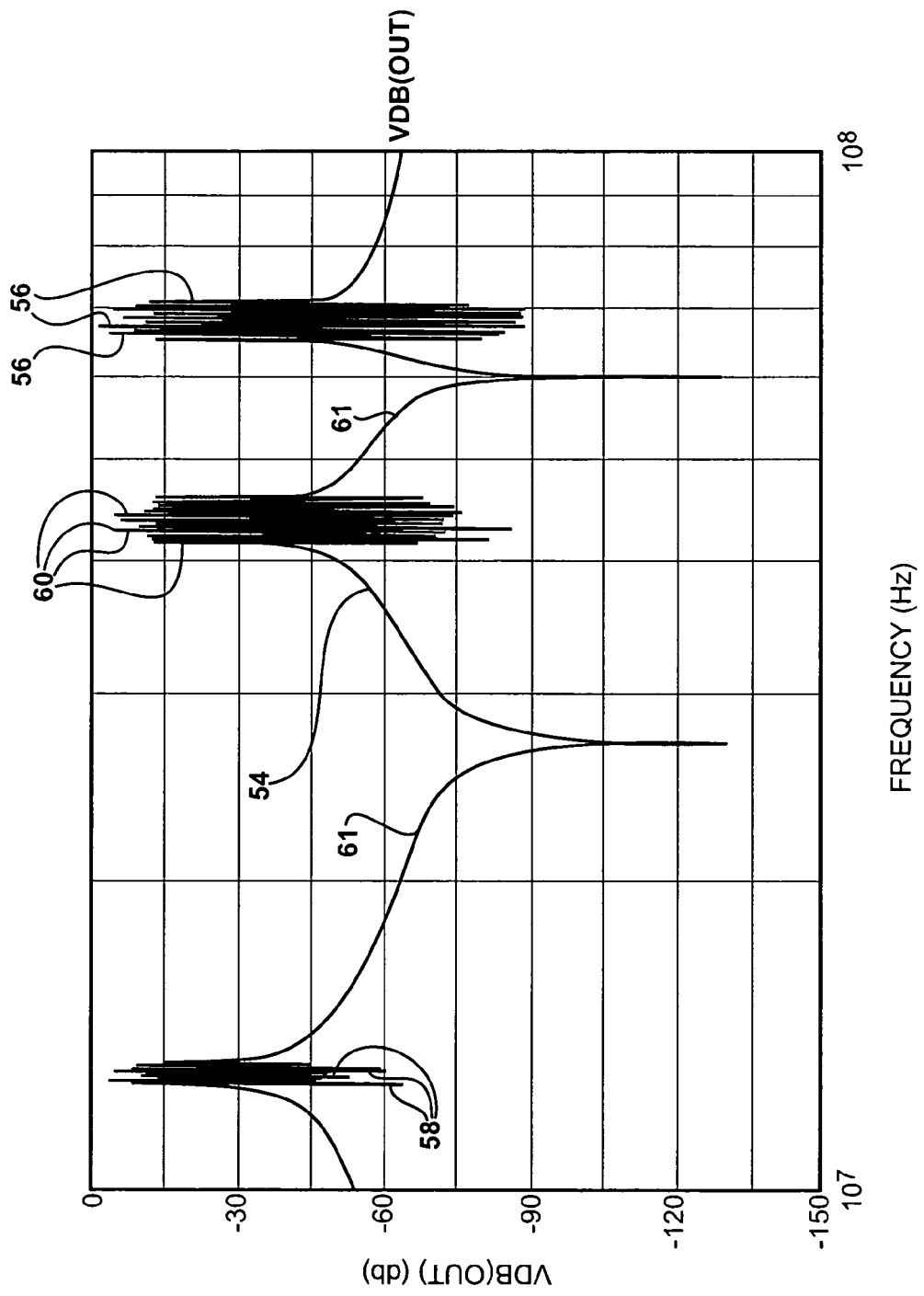
FIG. 4 is a graph representation of an output of the sensing assembly when the reservoir has two liquids therein.

Referring to FIG. 4, it can be seen that several of the spikes 56 have shifted outside the calibration range of 50–75 MHz. Of the spikes that have moved outside the calibration range, several have shifted to form a first shifted set of spikes 58. In addition, a second shifted set of spikes 60 have shifted to a frequency differing from the first shifted set 58. In terms of frequency, the two shifted sets of spikes 58, 60 are distinct from each other and are separated by ranges of frequencies that have absolutely no spikes therein. These are variation free ranges 61. The two shifted sets 58, 60 are distinct because they each represent one of the two liquids 16, 17 and each liquid 16, 17 has a unique dielectric constant. The different dielectric constants change the frequency outputs at each of the individual capacitors 50 that are surrounded by a particular liquid 16, 17. The first shifted set of spikes 58 identify a first liquid that is found within the reservoir 12 and the second set of spikes 60 identify a second liquid 17 within the reservoir 12. And the number of spikes 58, 60 in each of the shifted sets or clusters outside the calibration range identify the level of each of the liquids 16, 17 within the reservoir 12. By counting each of the spikes within each of the clusters 58, 60, and knowing the distance between the plurality of plates 44, the levels 11, 14 of the liquid 16, 17 in the reservoir 12 are calculated.

In addition, by knowing the capacitive values and the inductive values, it can be determined as to which types of liquid 16, 17 are in the reservoir 12. This can be done by matching values with these stored in a memory device (not shown) that have been measured through testing.

Figure 5:
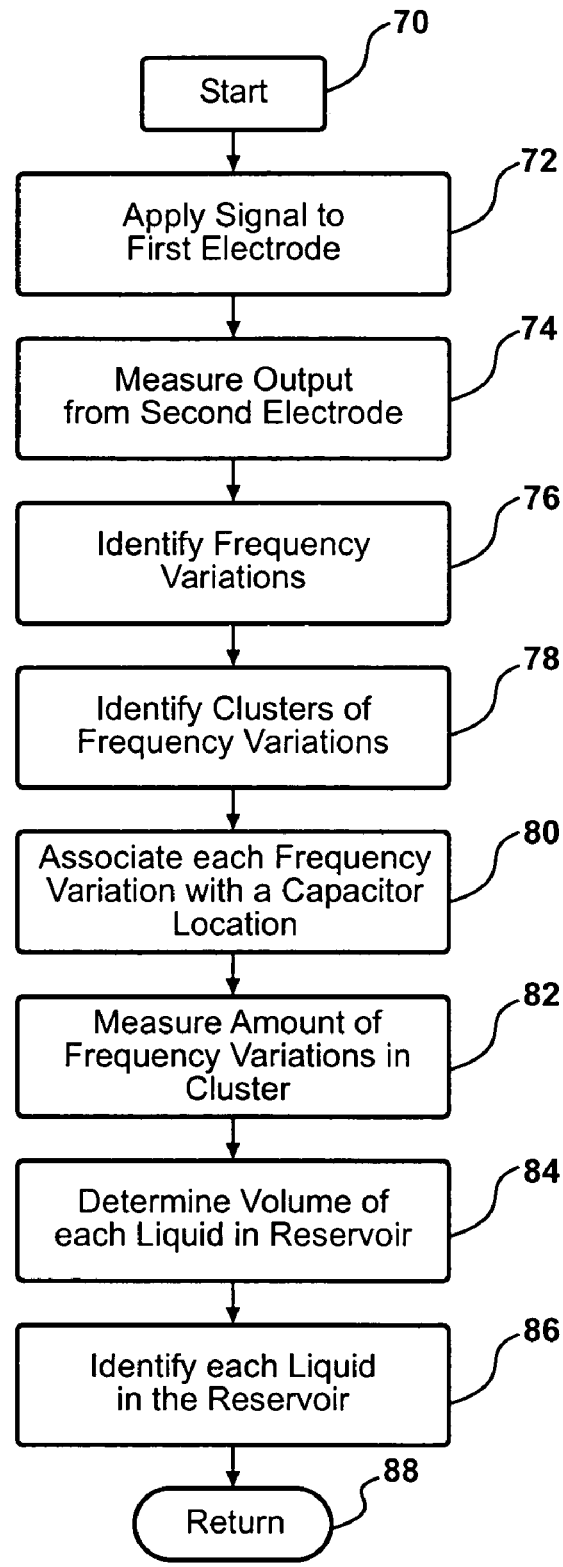
FIG. 5 is a logic chart of one method of operation for the sensing assembly.

In operation, and with reference to FIG. 5, the method begins at 70. A signal is applied to the first electrode 28 at 72. The output from the second electrode 36 is measured at 74. Frequency variations in the output are identified at 76. Clusters of spikes 58, 60 are identified at 78. Each frequency variation is associated with a capacitor 50. This capacitor location is associated with a frequency at 80. The amount of frequency variations in each cluster 58, 60 is measured at 82 and the volume of each liquid 16, 17 in the reservoir 12 is determined at 84. Each liquid 16, 17 is identified at 86. And the method returns at 88.

The invention has been described in an illustrative manner. It is to be understood that the terminology, which has been used, is intended to be in the nature of words of description-rather than of limitation.

Many modifications and variations of the invention are possible in light of the above teachings. Therefore, within the scope of the appended claims, the invention may be practiced other than as specifically described.

What is claimed:

1. A method for identifying a level of each of a plurality of liquids in a reservoir using a sensing assembly having first and second electrodes extending along a side of the reservoir, wherein the first and second electrodes combine to form a plurality of capacitors each having a unique capacitance, the method comprising the steps of:
    applying an input voltage to the first electrode;
    measuring an output voltage across the second electrode;
    locating clusters of frequency variations; and
    associating a level identification for each of the plurality of liquids with each of the clusters of frequency variations.

2. A method as set forth in claim 1 including the step of counting each frequency variation in each of the clusters of voltage variations to determine a number of frequency variations in each of the clusters of voltage variations.

3. A method as set forth in claim 2 including the step of identifying the type of each of the liquids by associating the locations of the clusters of frequency variations with a dielectric value of each of the plurality of liquids.

4. A method as set forth in claim 3 including the step of measuring the volume of each of the plurality of liquids by associating the number of frequency variations with one of the plurality of liquids at one of the plurality of capacitors.

5. A method as set forth in claim 4 including the step of defining each of the frequency variations as having a rapid change in decibels over a short range of frequencies.

6. A method as set forth in claim 5 including the step of identifying variation-free space between each of clusters of frequency variations.

7. A method as set forth in claim 6 including the step of defining a variation-free space as being a range of frequency void of at least two frequency variations disposed immediately adjacent each other.

8. A method for identifying a level of each of a plurality of liquids in a reservoir using a sensing assembly having first and second electrodes extending along a side of the reservoir, wherein the first and second electrodes combine to form a plurality of capacitors each having a unique capacitance, the method comprising the steps of:
    applying an input voltage to the first electrode;
    measuring an output voltage across the second electrode;
    locating clusters of frequency variations;
    associating a level identification for each of the plurality of liquids with each of the clusters of frequency variations; and
    identifying variation-free space between each of clusters of frequency variations.

9. A method as set forth in claim 8 including the step of defining a variation-free space as being a range of frequency void of at least two frequency variations disposed immediately adjacent each other.

10. A method as set forth in claim 9 including the step of counting each frequency variation in each of the clusters of voltage variations to determine a number of frequency variations in each of the clusters of voltage variations.

11. A method as set forth in claim 10 including the step of identifying the type of each of the liquids by associating the locations of the clusters of frequency variations with a dielectric value of each of the plurality of liquids.

12. A method as set forth in claim 11 including the step of measuring the volume of each of the plurality of liquids by associating the number of frequency variations with one of the plurality of liquids at one of the plurality of capacitors.

13. A method as set forth in claim 12 including the step of defining each of the frequency variations as having a rapid change in voltage over a short period of time.

14. A method for identifying a level of each of a plurality of liquids in a reservoir using a sensing assembly having first and second electrodes extending along a side of the reservoir, wherein the first and second electrodes combine to form a plurality of capacitors each having a unique capacitance, the method comprising the steps of:
    applying an input voltage to the first electrode;
    measuring an output voltage across the second electrode;
    locating clusters of frequency variations;
    associating a level identification for each of the plurality of liquids with each of the clusters of frequency variations; and
    identifying the type of each of the plurality of liquids by associating the locations of the clusters of frequency variations with a dielectric value of each of the plurality of liquids.

15. A method as set forth in claim 14 including the step of counting each frequency variation in each of the clusters of voltage variations to determine a number of frequency variations in each of the clusters of voltage variations.

16. A method as set forth in claim 15 including the step of measuring the volume of each of the plurality of liquids by associating the number of frequency variations with one of the plurality of liquids at one of the plurality of capacitors.

17. A method as set forth in claim 16 including the step of defining each of the frequency variations as having a rapid change in voltage over a short period of time.

18. A method as set forth in claim 17 including the step of identifying variation-free space between each of clusters of frequency variations.

19. A method as set forth in claim 18 including the step of defining a variation-free space as being a range of frequency void of at least two frequency variations disposed immediately adjacent each other.

\* \* \* \* \*